United States Patent
Cho et al.

(10) Patent No.: US 11,218,239 B2
(45) Date of Patent: Jan. 4, 2022

(54) OPERATING METHOD OF TERMINAL IN WIRELESS COMMUNICATION SYSTEM AND TERMINAL FOR PERFORMING THE METHOD

(71) Applicant: SAMSUNG ELECTRONICS CO., LTD., Suwon-si (KR)

(72) Inventors: Sungyoon Cho, Suwon-si (KR); Joohyun Do, Suwon-si (KR); Myungjoon Shim, Suwon-si (KR); Haechul Lee, Suwon-si (KR); Bora Lim, Suwon-si (KR); Dahae Chong, Suwon-si (KR); Seungjoong Hwang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 230 days.

(21) Appl. No.: 16/685,354

(22) Filed: Nov. 15, 2019

(65) Prior Publication Data

US 2020/0169347 A1 May 28, 2020

(30) Foreign Application Priority Data

Nov. 28, 2018 (KR) .................. 10-2018-0150086
Apr. 12, 2019 (KR) .................. 10-2019-0043304

(51) Int. Cl.
H04J 11/00 (2006.01)
H04W 72/00 (2009.01)
H04W 56/00 (2009.01)

(52) U.S. Cl.
CPC ....... *H04J 11/0069* (2013.01); *H04W 56/001* (2013.01); *H04W 72/005* (2013.01)

(58) Field of Classification Search
CPC ... H04J 11/0069–0093; H04W 56/001; H04W 56/0015; H04W 56/006; H04W 72/005; H04W 72/04
See application file for complete search history.

(56) References Cited

U.S. PATENT DOCUMENTS 8,576,810 B2   11/2013 Yi
8,954,055 B2   2/2015 Srinivasan et al.
(Continued)

FOREIGN PATENT DOCUMENTS

JP   2018-514990      6/2018
KR   10-2013-0121649  11/2013
KR   10-1629680       6/2016

*Primary Examiner* — Michael Thier
*Assistant Examiner* — Prince A Mensah
(74) *Attorney, Agent, or Firm* — F. Chau & Associates, LLC

(57) ABSTRACT

An operating method of a terminal performing a cell search using first and second memories for buffering input samples includes detecting a first primary synchronization signal (PSS) group from a first input sample group while buffering the first input sample group in the first memory in a first interval. While buffering a second input sample group in the second memory in a second interval following the first interval, the method detects a second PSS group from the second input sample group, and a first secondary synchronization signal (SSS) group corresponding to the first PSS group from the first input sample group. While buffering a third input sample group in the first memory in a third interval following the second interval, the method detects a third PSS group from the third input sample group, and a second SSS group corresponding to the second PSS group from the second input sample group.

20 Claims, 18 Drawing Sheets

(56) References Cited

U.S. PATENT DOCUMENTS

| | | | |
|---|---|---|---|
| 9,237,536 B2 | 1/2016 | Zhang et al. | |
| 2011/0243104 A1* | 10/2011 | Swarts | H04L 27/2675 370/336 |
| 2013/0248640 A1 | 9/2013 | Wei | |
| 2014/0018072 A1* | 1/2014 | Wei | H04W 48/16 455/434 |
| 2014/0293954 A1* | 10/2014 | Horvat | H04L 5/0053 370/330 |
| 2017/0135052 A1 | 5/2017 | Lei et al. | |
| 2018/0109344 A1 | 4/2018 | Ly et al. | |

* cited by examiner

OPERATING METHOD OF TERMINAL IN WIRELESS COMMUNICATION SYSTEM AND TERMINAL FOR PERFORMING THE METHOD

CROSS-REFERENCE TO RELATED APPLICATIONS

This application claims priority under 35 U.S.C. § 119 to Korean Patent Application Nos. 10-2018-0150086 and 10-2019-0043304, respectively filed on Nov. 28, 2018 and Apr. 12, 2019, in the Korean Intellectual Property Office, the disclosures of which are incorporated by reference herein in their entireties.

TECHNICAL FIELD

Exemplary embodiments of the inventive concept relate to an operating method of a terminal performing an effective cell search in a wireless communication system, and a terminal for the method.

DISCUSSION OF THE RELATED ART

A fifth-generation (5G) (or, new radio (NR)) communication system uses new wireless access technology. The 5G communication system provides an ultra high-speed data service of several Gbps by using an ultra-wideband with a bandwidth of about 100 MHz or more, compared with existing long-term evolution (LTE) and LTE-advanced (A) (LTE-A) communication systems. However, since it is difficult to secure an ultra-wideband frequency of about 100 MHz or more in a frequency band of several hundred MHz or several GHz used in the LTE and LTE-A communication systems, a method of transmitting signals by using a wide frequency bandwidth that exists in a frequency band of about 6 GHz or more is under consideration for the 5G communication system. In the 5G communication system, a transmission rate may be increased by using a millimeter wave band such as a band of about 28 GHz or a band of about 60 GHz.

SUMMARY

According to an exemplary embodiment an operating method of a terminal configured to perform a cell search by using a first memory and a second memory for buffering input samples includes detecting a first primary synchronization signal (PSS) group from a first input sample group while buffering the first input sample group in the first memory in a first interval. The method further includes while buffering a second input sample group in the second memory in a second interval following the first interval, detecting a second PSS group from the second input sample group, and a first secondary synchronization signal (SSS) group corresponding to the first PSS group from the first input sample group. The method further includes while buffering a third input sample group in the first memory in a third interval following the second interval, detecting a third PSS group from the third input sample group, and a second SSS group corresponding to the second PSS group from the second input sample group.

According to an exemplary embodiment, an operating method of a cell terminal equipped with a plurality of memories for alternately buffering input samples generated for a cell search operation in a certain buffering interval includes buffering a first input sample group utilized for a first valid cell search operation in a first interval in a first memory, and buffering a second input sample group utilized for a second valid cell search operation in a second interval following the first interval in a second memory. The first valid cell search operation is performed by using the first input sample group in a first search interval including the first interval and the second interval.

According to an exemplary embodiment, a terminal includes a buffer divided into a first memory and a second memory for alternately buffering input samples generated for a cell search operation in a certain buffering interval, and a baseband processor configured to control a first valid cell search operation from a first input sample group to be buffered in the first memory in a first interval during a first search interval including the first interval and a second interval following the first interval. A second input sample group utilized for a second valid cell search operation in the second interval is buffered in the second memory.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION OF THE EXEMPLARY EMBODIMENTS

Figure 1:
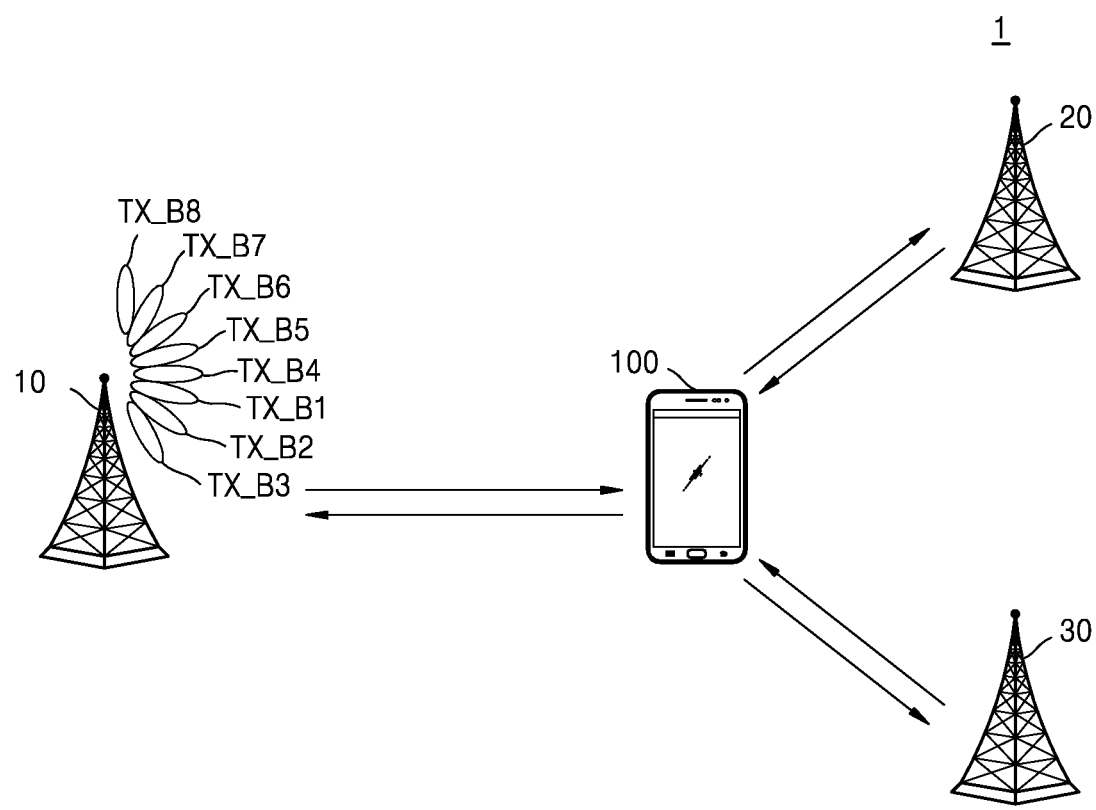
FIG. 1 is a block diagram of a wireless communication system according to an exemplary embodiment of the inventive concept.

Exemplary embodiments of the inventive concept will be described more fully hereinafter with reference to the accompanying drawings. Like reference numerals may refer to like elements throughout the accompanying drawings. It will be understood that the terms "first," "second," "third," etc. are used herein to distinguish one element from another, and the elements are not limited by these terms. Thus, a "first" element in an exemplary embodiment may be described as a "second" element in another exemplary embodiment.

Figure 2:
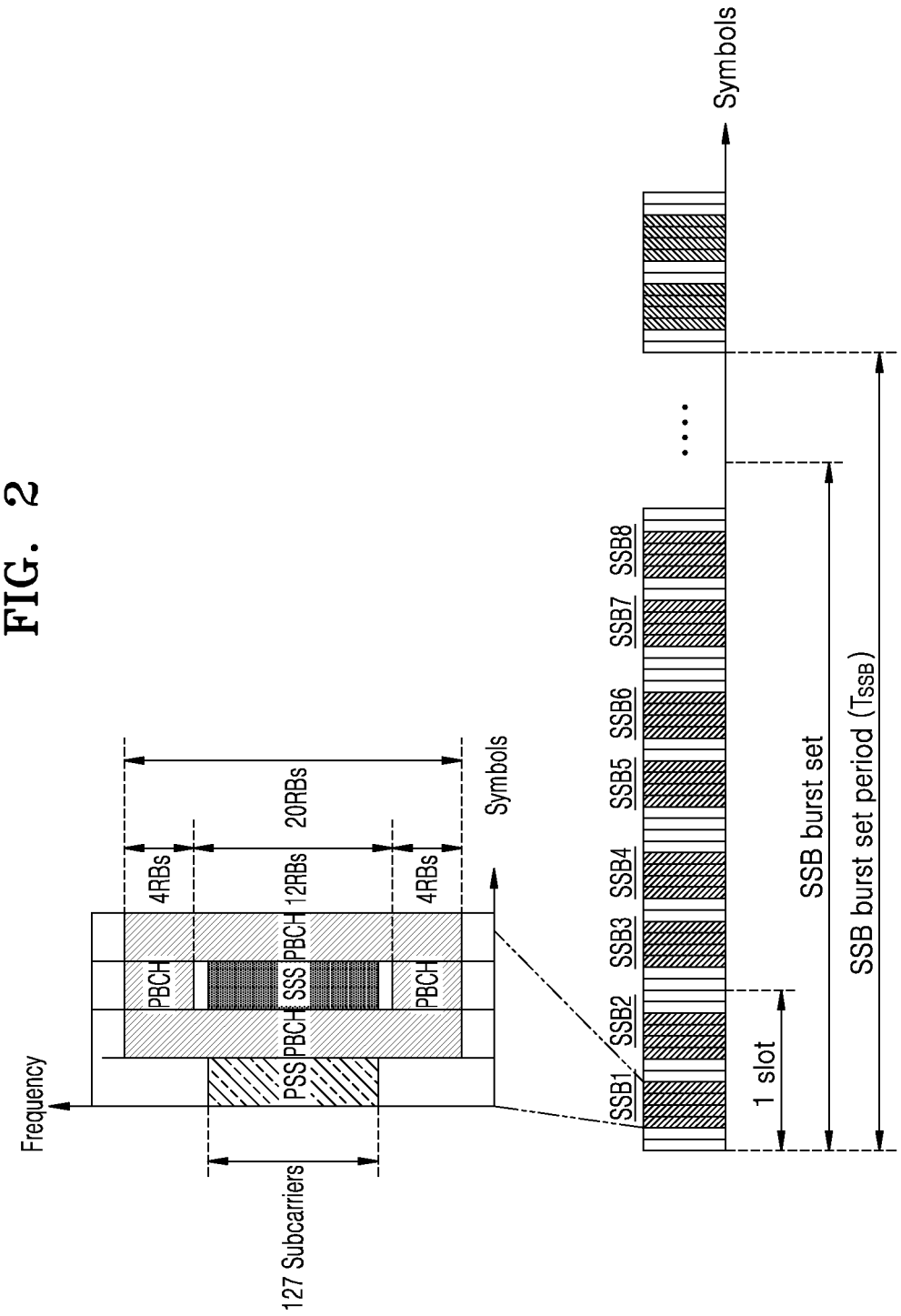
FIG. 2 is a diagram illustrating a synchronization signal including a synchronization signal block (SSB) utilized during a cell search.

FIG. 1 is a block diagram of a wireless communication system 1 according to an exemplary embodiment of the inventive concept. FIG. 2 is a diagram illustrating a synchronization signal including a synchronization signal block (SSB) utilized during a cell search.

As illustrated in FIG. 1, the wireless communication system 1 may include first through third cells 10, 20, and 30 and a terminal 100. The cells 10, 20, and 30 may be, for example, cellular towers. For convenience of description, the wireless communication system 1 is illustrated as including only three cells (10, 20, and 30). However, exemplary embodiments of the inventive concept are not limited thereto. For example, in exemplary embodiments, the wireless communication system 1 may be implemented to include more or less than three cells (10, 20, and 30).

The terminal 100 may be connected to the wireless communication system 1 by transceiving signals to and from the first through third cells 10, 20, and 30. The wireless communication system 1, to which the terminal 100 is capable of being connected, may include a system using radio access technology (RAT) and may include, for example, a wireless communication system using a cellular network such as a fifth-generation (5G) communication system, a long term evolution (LTE) communication system, an LTE-advanced (A) (LTE-A) communication system, a code division multiple access (CDMA) communication system, and a global system for mobile communications (GSM) communication system, or a wireless local area network (WLAN) communication system, or other wireless communication system. Hereinafter, descriptions are given assuming that the wireless communication system 1, to which the terminal 100 is connected, is a 5G communication system. However, exemplary embodiments of the inventive concept are not limited thereto, and exemplary embodiments may be applied to a next-generation wireless communication system.

In a 5G communication system, due to a beam forming technique for increasing an arrival distance of a radio wave, it is necessary not only to search for a cell capable of providing a good communication service in a cell search operation of the terminal, but also to search for a transmit beam matching a receive beam of the terminal among a plurality of transmit beams formed by the cell. Thus, to this end, the number of input samples of synchronization signals to be buffered by the terminal increases drastically. As a result, there is a possibility that an available memory space for data processing operations other than the cell search operation of the terminal may be limited, and thus, the overall performance of the terminal may be reduced. Exemplary embodiments of the inventive concept are directed to utilizing the available memory space in a more efficient manner, as described in detail below.

A wireless communication network of the wireless communication system 1 may support communication of a plurality of wireless communication devices including the terminal 100 by sharing available network resources. For example, in the wireless communication network, information may be transferred in various multiple connection methods such as, for example, CDMA, frequency division multiple access (FDMA), time division multiple access (TDMA), orthogonal frequency division multiple access (OFDMA), single carrier frequency division multiple access (SC-FDMA), OFDM-FDMA, OFDM-TDMA, and OFDM-CDMA.

The first through third cells (10, 20, and 30) may generally be referred to as fixed stations in communication with the terminal 100 and/or other cells, and may exchange data and control information by communicating with the terminal 100 and other cells. For example, each of the first through third cells 10, 20, and 30 may be referred to as a base station, a Node B, an evolved-Node B (eNB), a next generation node B (gNB), a sector, a site, a base transceiver system (BTS), an access point (AP), a relay node, a remote radio head (RRH), a radio unit (RU), a small cell, etc. In the present specification, the cell or the base station may be interpreted in a generic sense to denote some area or function covered by a base station controller (BSC) in CDMA, the Node-B in WCDMA, an eNode B (eNB) in LTE, or a sector, etc., and may cover all various coverage areas such as, for example, megacell, macrocell, microcell, picocell, femtocell, the relay node, RRH, RU, and a small cell communication range.

The terminal 100 may be fixed or mobile as user equipment (UE), and may be referred to as any device capable of communicating with the cell(s) to transceive data to and from the cell(s) and/or control information. For example, the terminal 100 may be referred to as a mobile station (MS), a mobile terminal (MT), a user terminal (UT), a subscriber station (SS), a smartphone, a wireless device, a handheld device, etc.

Referring to FIG. 1, the first through third cells 10, 20, and 30 may be connected to the terminal 100 via a wireless channel and may provide various communication services. The first through third cells 10, 20, and 30 may serve all user traffic via a shared channel, and may perform scheduling by collecting status information such as, for example, a buffer status, an available transmission power status, and a channel status of the terminal 100. The wireless communication system 1 may support beamforming technology by using OFDM as the radio access technology. In addition, the wireless communication system 1 may support an adaptive modulation and coding (AMC) method for determining a modulation scheme and a channel coding rate according to the channel state of the terminal 100.

The wireless communication system 1 may transceive signals by using a wide frequency band existing in a frequency band of about 6 GHz or more. For example, in the wireless communication system 1, a data transmission rate may be increased by using a millimeter wave band such as a band of about 28 GHz or a band of about 60 GHz. In this case, the millimeter wave band may support a directional beam-based transception generated by using multiple antennas for securing a coverage, because a magnitude of signal attenuation with respect to a distance is relatively large. The wireless communication system 1 may perform a beam sweeping operation for the directional beam-based transception.

The beam sweeping may be a process of determining a transmit beam and a receive beam, which have orientation directions modulated with each other, by sequentially or randomly sweeping directional beams having a certain pattern by the terminal 100 and the first through third cells 10, 20, and 30. For example, a pattern of the transmit beam and a pattern of the receive beam, which have the orientation directions tuned with each other, may be determined as a pair of the transmit/receive beam patterns. The beam pattern may be a shape of a beam determined by a width and an orientation direction thereof. Hereinafter, an exemplary embodiment is described mainly for a case in which the terminal 100 performs the cell search, and it is assumed that the first through third cells (10, 20, and 30) transmit synchronization signals, each of which includes the SSB utilized for the cell search, to the terminal 100 via a plurality of transmit beams having different beam patterns from each other. As an example, the first cell 10 may transmit synchronization signals each including SSBs utilized for the cell search to the terminal 100 via first through eighth transmit beams TX_B1 through TX_B8. However, it should be appreciated that FIG. 1 is only an example for convenience of understanding, that exemplary embodiments are not limited thereto, and that various cases may occur according to a communication environment or communication situation of the wireless communication system 1.

Referring to FIGS. 1 and 2, for example, the first cell 10 may transmit synchronization signals including any one of first through eighth SSBs SSB1 through SSB8 to the terminal 100 via the first through eight transmit beams TX_B1 through TX_B8, respectively. For example, the first cell 10 may transmit a signal including the first SSB SSB1 to the terminal 100 via the first transmit beam TX_B1, a signal including the second SSB SSB2 to the terminal 100 via the second transmit beam TX_B2, etc. In this manner, the first cell 10 may transmit the first through eighth SSBs SSB1 through SSB8 to the terminal 100 via the first through eighth transmit beams TX_B1 through TX_B8, respectively, and the terminal 100 may search for the first cell 10 by using any one of the first through eighth SSBs SSB1 through SSB8.

As illustrated in FIG. 2, the SSB may include a primary synchronization signal PSS, a secondary synchronization signal SSS, and a physical broadcast channel PBCH. In an exemplary embodiment, the SSB may include four symbols, and the primary synchronization signal PSS, the secondary synchronization signal SSS, and the physical broadcast channel PBCH may be located at locations corresponding to certain resource blocks RB in a frequency axis direction. In addition, one resource block RB may include 12 consecutive subcarriers. As an example, the primary synchronization signal PSS corresponding to a first symbol may be transmitted to the terminal 100 via 127 subcarriers.

In an exemplary embodiment, two SSBs may be in one slot, and the first cell 10 may transmit an SSB burst set to the terminal 100 in a certain SSB burst set period $T_{SSB}$. For example, assuming that the wireless communication system 1 is new radio (NR) with a subcarrier spacing of about 15 kHz, the first cell 10 may transmit the SSB burst set including the first through eighth SSBs SSB1 through SSB8 to the terminal 100 during the SSB burst set period $T_{SSB}$. In this case, a length of one slot may be about 1 ms, and the SSB burst set period $T_{SSB}$ may be about 20 ms. However, exemplary embodiments are not limited thereto, and the number of SSBs included in the SSB burst set, the SSB burst set period $T_{SSB}$, and the length of one slot may vary according to, for example, a size of the subcarrier spacing, a synchronization signal period set in the first cell 10, a time interval allocated for the cell search, etc.

For example, the first through eighth SSBs SSB1 through SSB8 may be transmitted to the terminal 100 via the first through eighth transmit beams TX_B1 through TX_B8 of the first cell 10, respectively, and in this manner, the second cell 20 and the third cell 30 may also transmit synchronization signals including the SSBs utilized for searching for the second cell 20 and the third cell 30 by the terminal 100 to the terminal 100 via the plurality of transmit beams.

The terminal 100 according to an exemplary embodiment of the inventive concept may receive synchronization signals from the first through third cells 10, 20, and 30, generate a plurality of input samples by sampling synchronization signals, and perform a valid cell search operation per input sample group by dividing the input samples into certain input sample groups. The plurality of input samples may include a plurality of primary synchronization signals PSS, a plurality of secondary synchronization signals SSS, and a plurality of physical broadcast channels PBCH, which are received from each of the first through third cells 10, 20, and 30. The terminal 100 may perform a multiple buffering operation on the plurality of input samples by using a plurality of memories of the terminal 100 to perform the valid cell search operation per the input sample group. Details of the valid cell search operation per the input sample group and the multiple buffering operations on the input samples of the terminal 100 are described below.

Figure 3:
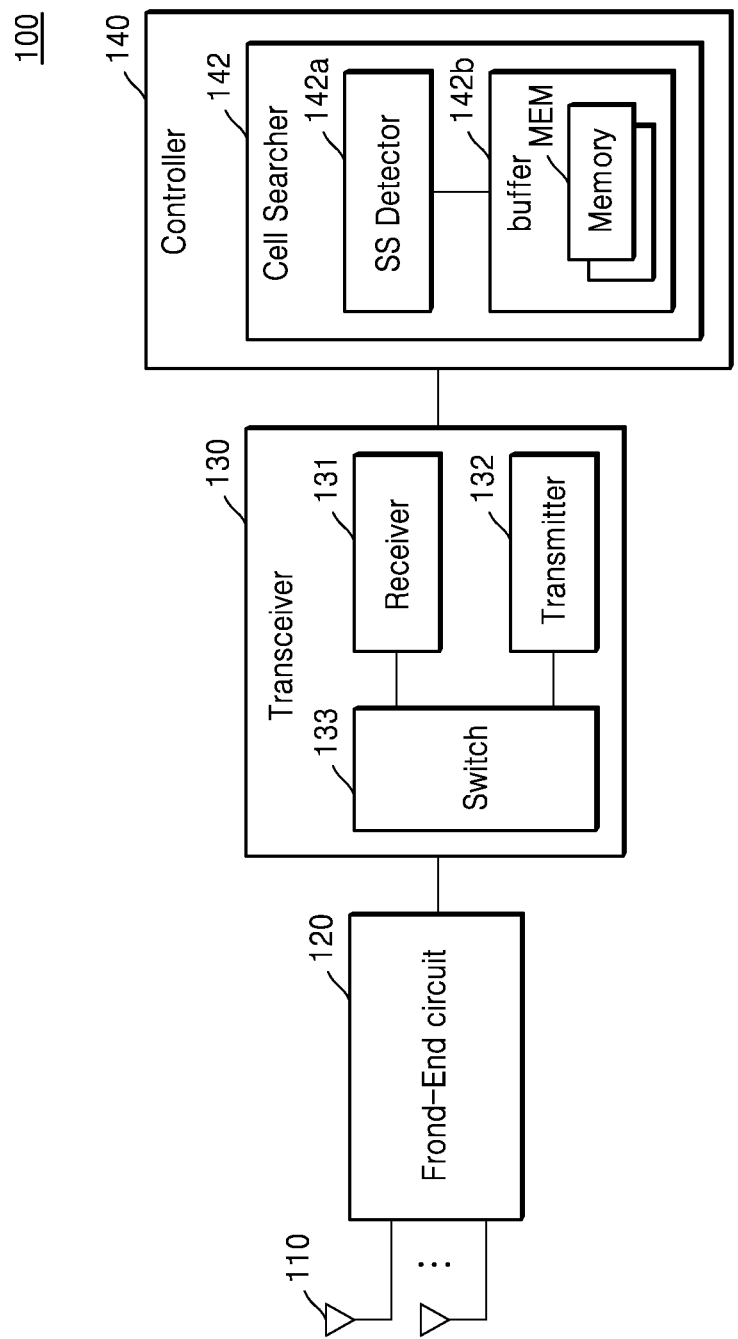
FIG. 3 is a block diagram of a terminal according to an exemplary embodiment of the inventive concept.

FIG. 3 is a block diagram illustrating the terminal 100 in detail, according to an exemplary embodiment of the inventive concept.

Referring to FIG. 3, the terminal 100 may include a plurality of antennas 110, a front-end circuit 120, a transceiver 130, and a controller 140. The plurality of antennas 110 may be connected to the front-end circuit 120 and may transmit signals provided by the front-end circuit 120 to other wireless communication devices (terminals or cells), or provide signals received from the other wireless communication devices to the front-end circuit 120. In exemplary embodiments, the terminal 100 may support a phased array, multiple-input and multiple-output (MIMO), etc., by using the plurality of antennas 110. The front-end circuit 120 may include an antenna tuner, and the antenna tuner may be connected to the plurality of antennas 110 to adjust the impedance of the plurality of antennas 110.

The transceiver 130 may include a receiver 131, a transmitter 132, and a switch 133. The receiver 131 may generate a baseband receive signal by processing a radio frequency (RF) receive signal received from the switch 133. As an example, the receiver 131 may include a filter, a mixer, a low noise amplifier, etc. The receiver 131 may process synchronization signals of the RF band received from the switch 133 to generate baseband synchronization signals, and the baseband synchronization signals may be provided to the controller 140. The transmitter 132 may generate an RF transmit signal by processing a baseband transmit signal received from the controller 140. The transmitter 132 may include, for example, a filter, a mixer, a power amplifier, etc.

The controller 140 may include a cell searcher 142, and the cell searcher 142 may include a synchronization signal (SS) detector 142a and a buffer 142b. Components included in the controller 140 may be implemented as a dedicated hardware block designed by using logic synthesis, etc., or may be implemented as at least one processor and a processing unit including a software block executed by the at least one processor, and may be implemented as a combination of dedicated hardware blocks and processing units. In the present specification, the controller 140 may be referred to as a device for efficiently performing the cell search.

The cell searcher 142 may perform the cell search operation and may allow the terminal 100 to be connected to the wireless communication system 1 via a searched cell and perform wireless communication. The SS detector 142*a* may perform the valid cell search operation per input sample group by dividing a plurality of input samples generated by sampling the baseband synchronization signals into input sample group units. The SS detector 142*a* may, when performing the valid cell search operation, perform multiple buffering for a plurality of input samples by using a plurality of memories MEM of the buffer 142*b*.

For example, the plurality of memories MEM of the buffer 142*b* may alternately perform buffering of the input samples in the input sample group units. For example, the input sample groups having odd numbers of turns may be buffered in a first memory of the plurality of memories MEM, and the input sample groups having even numbers of turns may be buffered in a second memory of the plurality of memories MEM. This is described further with reference to FIG. 4. The plurality of memories MEM of the buffer 142*b* may be physically separated or virtually divided by an address management. The valid cell search operation may be referred to as a series of operations for detecting a primary synchronization signal PSS group and a secondary synchronization signal SSS group by using the input samples included in one input sample group and determining the valid cell by using the detected primary synchronization signal PSS group and secondary synchronization signal SSS group.

The terminal 100 according to an exemplary embodiment of the inventive concept may efficiently use memories by performing multiple buffering of input samples in input sample group units by using a plurality of memories, and may perform a prompt cell search by performing a valid cell search operation per input sample group.

Figure 4:
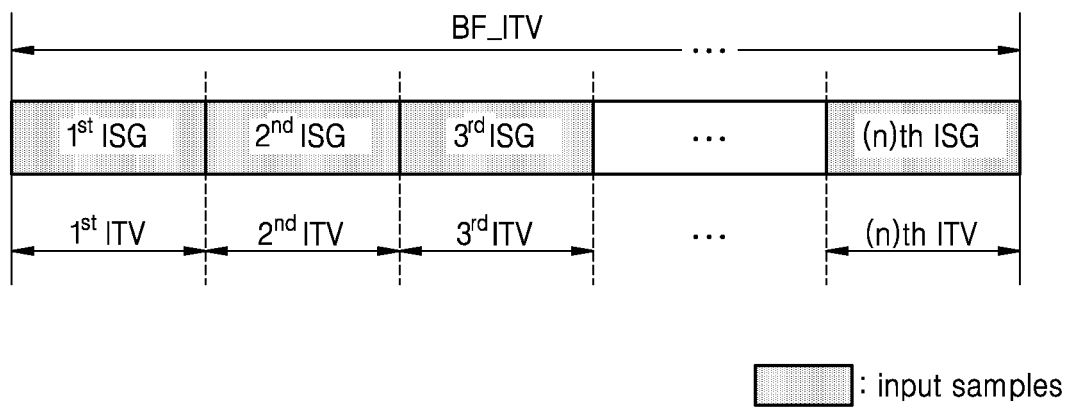
FIG. 4 is a diagram for explaining a multiple buffering operation, according to an exemplary embodiment of the inventive concept.
Figure 5:
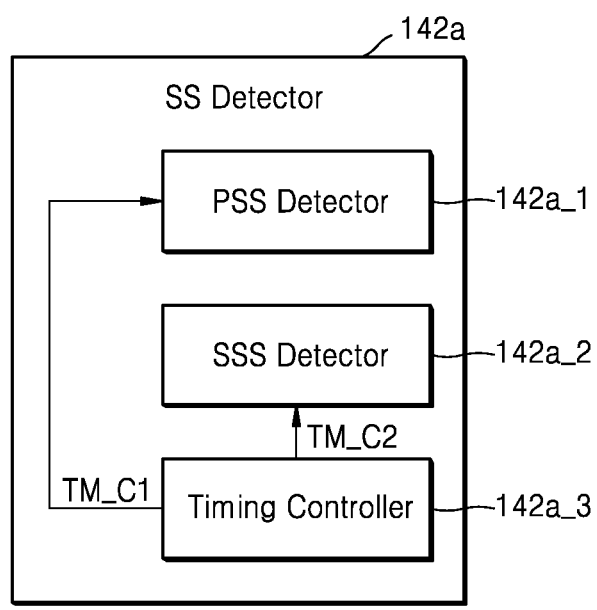
FIG. 5 is a block diagram of a synchronization signal detector according to an exemplary embodiment of the inventive concept.

FIG. 4 is a diagram for explaining a multiple buffering operation, according to an exemplary embodiment of the inventive concept. FIG. 5 is a block diagram of the SS detector 142*a* according to an exemplary embodiment of the inventive concept. In FIG. 4, a buffer for buffering the input samples of the terminal 100 is described assuming that the buffer includes the first memory and the second memory.

Referring to FIG. 4, in a certain buffering interval BF_ITV, the plurality of input samples may be divided into the input sample groups, and alternately buffered in the first memory and the second memory. The buffering interval BF_ITV may be set to match the SSB burst set period $T_{SSB}$ of FIG. 2. In addition, each length of first through $n^{th}$ intervals $1^{st}$ITV through $n^{th}$ITV may be determined according to the number of input samples included in first through $n^{th}$ input sample groups $1^{st}$ISG through $n^{th}$ISG. The plurality of input samples may be divided into the first through $n^{th}$ input sample groups $1^{st}$ISG through $n^{th}$ISG and alternately buffered in the first memory and the second memory in the first through nth intervals $1^{st}$ITV through $n^{th}$ITV.

For example, the first input sample group $1^{st}$ISG may be buffered in the first memory in the first interval $1^{st}$ITV, the second input sample group $2^{nd}$ISG may be buffered in the second memory in the second interval $2^{nd}$ITV, and the third input sample group $3^{rd}$ISG may be buffered in the first memory in the third interval $3^{rd}$ ITV. In an exemplary embodiment, the first memory and the second memory may have a sufficient capacity for buffering one input sample group, and a previously stored input sample group may be deleted when a new input sample group is to be buffered. Although FIG. 4 illustrates an exemplary embodiment in which the buffering interval BF_ITV is divided into the first through $n^{th}$ intervals $1^{st}$ITV through $n^{th}$ITV having the same length, exemplary embodiments are not limited thereto. For example, in exemplary embodiments, the lengths of the first through nth intervals $1^{st}$ITV through $n^{th}$ITV may vary according to environment, performance, workload, etc., and detailed exemplary embodiments thereof are described with reference to FIGS. 14A through 14D.

Referring to FIG. 5, the SS detector 142*a* may include a PSS detector 142*a*_1, an SSS detector 142*a*_2, and a timing controller 142*a*_3. The PSS detector 142*a*_1 may perform a PSS detection operation in input sample group units. The PSS detector 142*a*_1 may compute a correlation degree between the input samples of the input sample group and the PSS-based sequences, and determine the PSS group from the input sample group based on the computed correlation result. The PSS group may indicate a unit including input samples corresponding to a good candidate PSS for the cell search from a certain input sample group. For example, the PSS detector 142*a*_1 may compute the correlation degree between a target input sample and a corresponding PSS-based sequence, and may determine the target input sample as the PSS group when the computed correlation result is equal to or greater than a first reference value. The PSS detector 142*a*_1 may perform an operation of determining the PSS group in parallel with an operation of buffering the input sample group in a certain memory.

The SSS detector 142*a*_2 may select any one of the input samples of the PSS group detected by the PSS detector 142*a*_1, set an SSS configuration based on information obtained from the selected input sample, and determine the SSS group by performing, at least one time, an operation of detecting the SSS corresponding to the selected input sample based on the set SSS configuration. The SSS group may indicate a unit including input samples corresponding to a good candidate SSS for the cell search from a certain input sample group. The information obtained from the selected input sample may include a certain timing (for example, 5 ms timing) of a cell corresponding to the selected input sample, a primary identification number (PID) of the cell, a location of the SSS, etc.

The SSS detector 142*a*_2 may set an SSS configuration based on the information obtained from the selected input sample, and generate an SSS-based sequence based on the set SSS configuration. The SSS detector 142*a*_2 may compute a correlation degree between the generated SSS-based sequence and the input samples of the input sample group, and determine the SSS group from the input sample group based on the computed correlation result. For example, the SSS detector 142*a*_2 may compute the correlation degree between a target input sample and a corresponding SSS-based sequence, and may determine the target input sample as the SSS group when the computed correlation result is equal to or greater than a second reference value. The SSS detector 142*a*_2 may perform an operation of determining the SSS group by using an input sample group stored in a certain memory.

The timing controller 142*a*_3 may control operation timings of the PSS detector 142*a*_1 and the SSS detector 142*a*_3 according to a buffering state of the buffer 142*b* (see FIG. 3) of the terminal 100. In an example, the timing controller 142*a*_3 may provide a first timing control signal TM_C1 to the PSS detector 142*a*_1, and may control the PSS detector 142*a*_1 to perform the PSS detection operation by using the sample group while the input sample group is buffered in the memory of the buffer 142b (see FIG. 3). In addition, the timing controller 142a_3 may, after completing the SSS configuration based on the information obtained from the PSS group by providing a second timing control signal TM_C2 to the SSS detector 142a_2, control the SSS detector 142a_2 to perform the SSS detection operation by using the input sample group stored in the memory.

Furthermore, the timing controller 142a_3 may control the memory to complete the SSS detection operation (or, a valid cell search operation using the input sample group) for the input sample group before the memory storing the input sample group buffers the new input sample group. In an exemplary embodiment, the timing controller 142a_3 may set in advance the number of input samples (or PSS) of the PSS group, or limit the number of input samples (or PSS) of the PSS group used for detection of the SSS group. This is described further with reference to FIG. 7.

Figure 6:
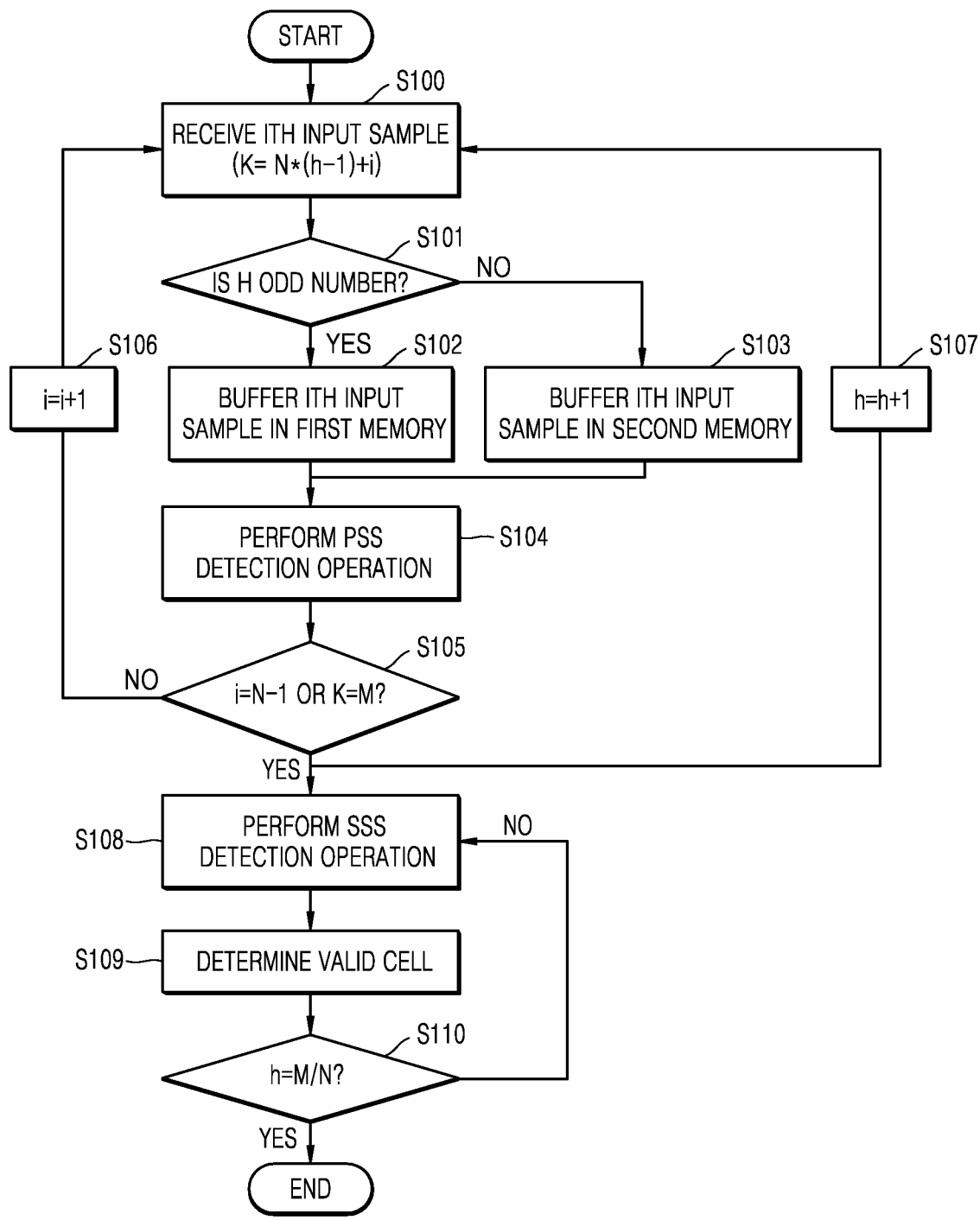
FIG. 6 is a flowchart illustrating an operating method of a cell searcher, according to an exemplary embodiment of the inventive concept.

FIG. 6 is a flowchart illustrating an operating method of the cell searcher 142, according to an exemplary embodiment of the inventive concept. FIG. 6 is described with reference to the configuration of the terminal 100 of FIG. 3. In addition, it is assumed that 'N' is the number of input samples included in one input sample group, 'h' is the ordinal number of the input sample group, 'i' is the ordinal number of the input sample included in the input sample group, 'K' is the ordinal number of the input sample determined based on all input samples, and 'M' is the number of all input samples.

Referring to FIG. 6, the cell searcher 142 may receive an $i^{th}$ input sample (S100) and determine whether the ordinal number 'h' of the input sample group including the $i^{th}$ input sample is odd (S101). When a result of operation S101 is 'YES', the $i^{th}$ input sample may be buffered in the first memory of the buffer 142b (S102). Otherwise, when the result of operation S101 is 'NO', the $i^{th}$ input sample may be buffered in the second memory of the buffer 142b (S103). The SS detector 142a may perform the PSS detection operation by using the $i^{th}$ input sample buffered in either the first memory or the second memory (S104).

The cell searcher 142 may determine whether 'i' is 'N-1' or 'K' is 'M' (S105). When a result of operation S105 is 'NO', 'i' may be counted up (S106), and operations S100 through S105 may be performed again. As an example, the cell searcher 142 may detect the PSS group from the first input sample group by buffering the input samples included in the first input sample group in the first memory through operations S100 through S106. When a result of operation S105 is 'YES', 'h' may be counted up (S107), and operations S100 through S105 may be performed again. As an example, after the buffering operation for the first input sample group is completed, the cell searcher 142 may perform an operation of buffering the second input sample group in the second memory.

When the result of operation S105 is 'YES', the SS detector 142a may perform the SSS detection operation by using the PSS group detected from a certain input sample group through operation S104 that has been performed multiple times (S108). In an example, the SS detector 142a may set the SSS configuration by using the PSS group detected from the first input sample group in an interval in which the buffering operation for the second input sample group is performed, and may detect the SSS group from the first input sample group by using the set SSS configuration. The cell searcher 142 may determine a valid cell by using the PSS group and the SSS group detected from a certain input sample group (S109). As an example, the cell searcher 142 may determine a valid cell by using the PSS group and the SSS group detected from the first input sample group (S109). The cell searcher 142 may determine whether 'h' is equal to 'M/N' (or, the total number of input sample groups) (S110). When a result of operation S110 is 'NO', operations S108 and S109 for the other input sample groups may be performed. Otherwise, when the result of operation S110 is 'YES', an execution of the valid cell search operation using the input samples may be terminated.

Figure 7:
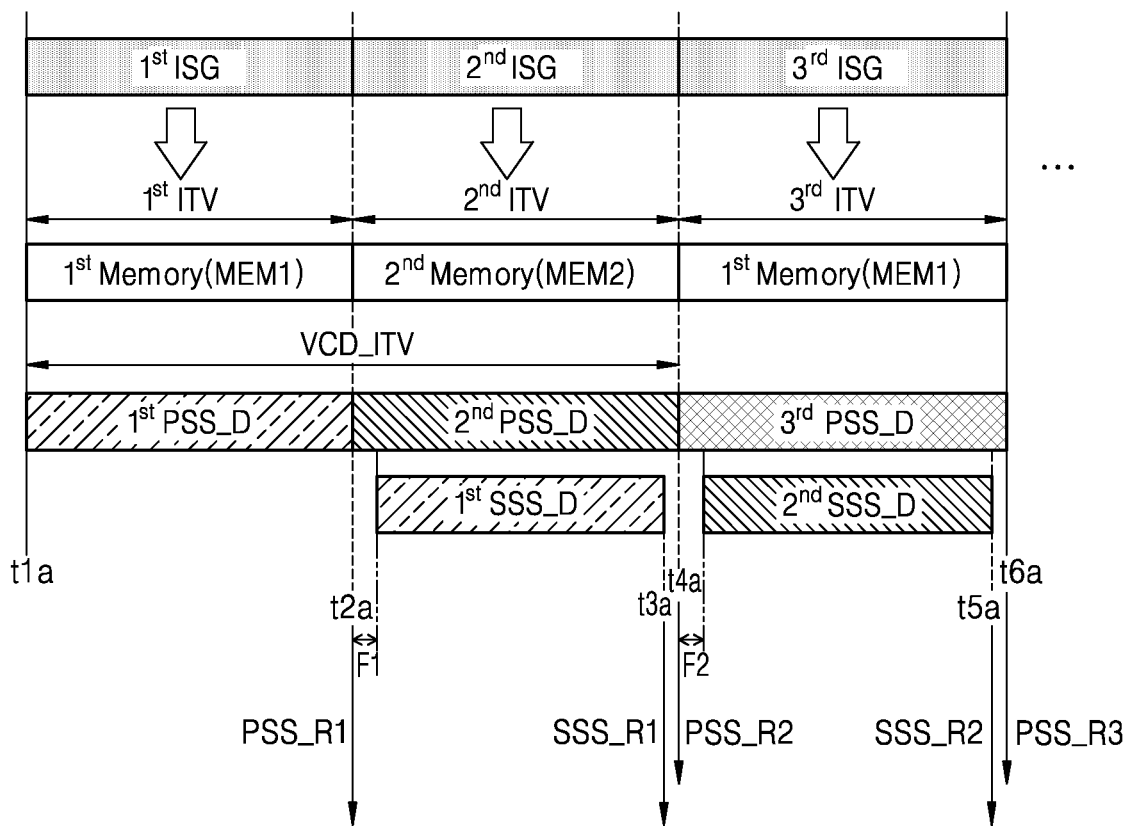
FIG. 7 is a diagram for explaining a detailed operating method of a cell searcher, according to an exemplary embodiment of the inventive concept.

FIG. 7 is a diagram for explaining a detailed operating method of the cell searcher 142, according to an exemplary embodiment of the inventive concept. In FIG. 7, it is assumed that the valid cell search operation is performed based on a double buffering operation using the first memory MEM1 and the second memory MEM2.

Referring to FIG. 7, the cell searcher 142 may generate a first PSS group detection result PSS_R1 by performing a first PSS group detection operation $1^{st}$ PSS_D from the first input sample group $1^{st}$ISG, while buffering the first input sample group $1^{st}$ISG in a first memory MEM1 in the first interval $1^{st}$ITV corresponding to a time between a time point 't1a' and a time point 't2a'. As described above, the cell searcher 142 may generate the first PSS group detection result PSS_R1 by computing the correlation degree between the input samples included in the first input sample group $1^{st}$ISG and the corresponding PSS-based sequences, and determining an input sample (or, PSS) matching a condition that the correlation result is equal to or greater than the first reference value as the first PSS group.

The cell searcher 142 may generate a second PSS group detection result PSS_R2 by performing a second PSS group detection operation $2^{nd}$PSS_D from the second input sample group $2^{nd}$ISG, while buffering the second input sample group $2^{nd}$ISG in a second memory MEM2 in the second interval $2^{nd}$ITV corresponding to a time between the time point 't2a' and a time point 't3a'. In addition, the cell searcher 142 may set the SSS configuration for performing the first SSS group detection operation $1^{st}$SSS_D based on the first PSS group detection result PSS_R1 in a certain interval F1 from a time point identical or similar to the time point 't2a'. The cell searcher 142 may perform a first SSS group detection operation $1^{st}$SSS_D in the second interval $2^{nd}$ITV based on the set SSS configuration, and generate a first SSS group detection result SSS_R1 until a time point 't3a'. As described above, the cell searcher 142 may generate the first SSS group detection result SSS_R1 by computing the correlation degree between the input samples included in the first input sample group $1^{st}$ISG and the corresponding SSS-based sequences, and determining an input sample (or, SSS) matching a condition that the correlation result is equal to or greater than the second reference value as the first SSS group. Thereafter, the cell searcher 142 may determine a valid cell by using at least one of the first PSS group detection result PSS_R1 and the first SSS group detection result SSS_R1 during a time interval between the time point 't3a' and the time point 't4a'.

In this manner, the cell searcher 142 may perform a first valid cell search operation including the first PSS group detection operation $1^{st}$PSSD and the first SSS group detection operation $1^{st}$SSS_D during a first search interval VCD_ITV. The first search interval VCD_ITV may include the first interval $1^{st}$ITV and the second interval $2^{nd}$ITV. Considering the time required to determine the valid cell, the cell searcher 142 may control the first SSS group detection operation $1^{st}$SSS_D to be completed by the time point 't3a'. The cell searcher 142 may determine the valid cell by using at least one of the first PSS group detection result PSS_R1 and the first SSS group detection result SSS_R1. The cell searcher 142 may perform a decoding operation on the physical broadcast channel PBCH of the determined valid cell, as described further with reference to FIGS. 11 and 12.

The cell searcher 142 may generate a third PSS group detection result PSS_R3 by performing a third PSS group detection operation $3^{rd}$PSS D from the third input sample group $3^{rd}$ISG, while buffering the third input sample group $3^{rd}$ISG in the first memory MEM1 in the third interval $3^{rd}$ITV corresponding to a time between the time point 't4a' and a time point 't5a'. In the third interval $3^{rd}$ITV, the first input sample group $1^{st}$ISG previously stored in the first memory MEM1 may be deleted. In addition, the cell searcher 142 may set the SSS configuration for performing the second SSS group detection operation $2^{nd}$SSS_D based on the second PSS group detection result PSS_R2 in a certain interval F2 from a time point identical or similar to the time point 't4a'. The cell searcher 142 may perform a second SSS group detection operation $2^{nd}$SSS_D in the third interval $3^{rd}$ITV based on the set SSS configuration, and generate a second SSS group detection result SSS_R2 until the time point 't5a'. Thereafter, the cell searcher 142 may determine a valid cell by using at least one of the second PSS group detection result PSS_R2 and the second SSS group detection result SSS_R2 during a time interval between the time point 't5a' and a time point 't6a'.

In this manner, the cell searcher 142 may perform the valid cell search operation for each input sample group, and perform an alternate buffering operation in the first memory MEM1 and the second memory MEM2 for each input sample group.

Figure 8:
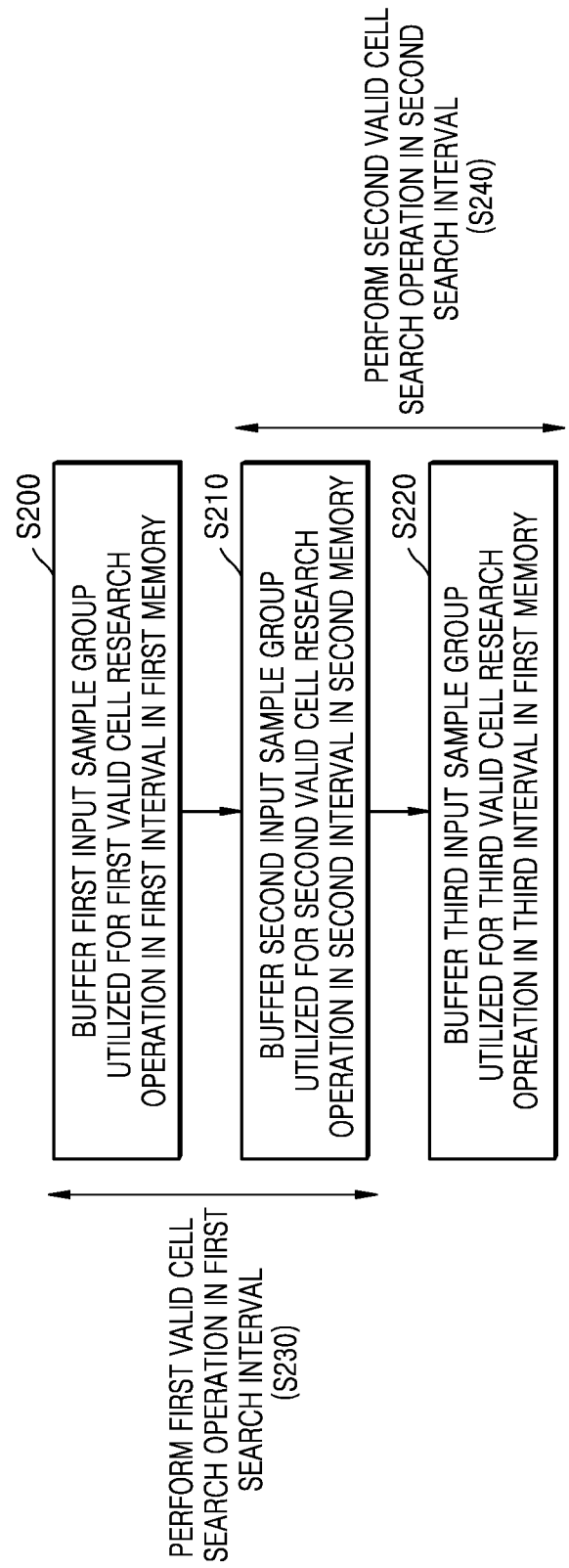
FIG. 8 is a flowchart illustrating a method of searching for a valid cell, performed by a cell searcher, according to an exemplary embodiment of the inventive concept.

FIG. 8 is a flowchart illustrating a method of searching for the valid cell of a cell searcher, performed by a cell searcher, according to an exemplary embodiment of the inventive concept. For example, the method of FIG. 8 may be performed by the cell searcher 142. FIG. 8 illustrates an operation of the cell searcher in any of the consecutive first through third intervals in the buffering interval, and it should be appreciated that the operation of the cell searcher described in FIG. 8 may be applied to other intervals in the buffering interval.

Referring to FIG. 8, the cell searcher may buffer the first input sample group utilized for the first valid cell search operation in the first interval in the first memory (S200). The cell searcher may buffer the second input sample group utilized for the second valid cell search operation in the second interval following the first interval in the second memory (S210). The cell searcher may buffer the third input sample group utilized for the third valid cell search operation in the third interval following the second interval in the first memory (S220). The cell searcher may perform the first valid cell search operation in the first detection interval including the first interval and the second interval (S230). As described above, the first valid cell search operation may include the first PSS group detection operation using the first input sample group, the first SSS group detection operation, and the valid cell search operation using the first PSS group and the first SSS group. The cell searcher may perform the second valid cell search operation during the second detection interval including the second interval and the third interval (S240). As described above, the second valid cell search operation may include the second PSS group detection operation using the second input sample group, the second SSS group detection operation, and the valid cell search operation using the second PSS group and the second SSS group.

Figure 9:
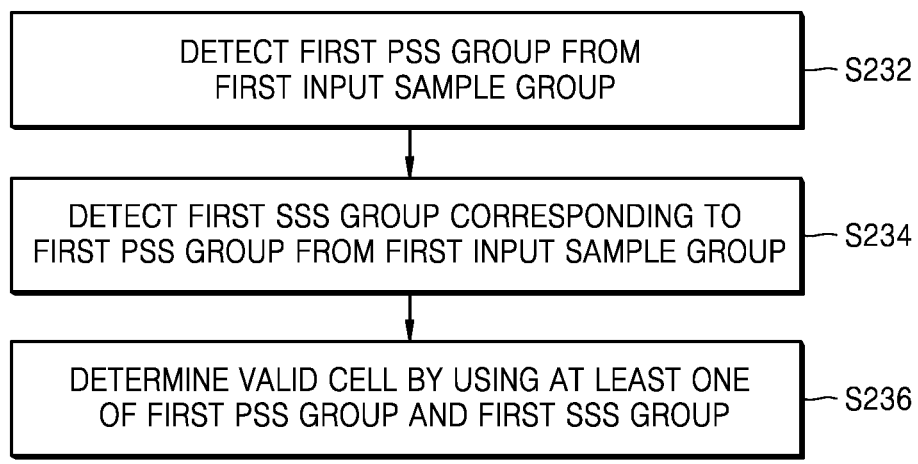
FIG. 9 is a flowchart illustrating operation S230 in FIG. 8 in detail.

FIG. 9 is a flowchart illustrating operation S230 in FIG. 8 in detail.

Referring to FIG. 9, the cell searcher may detect the first PSS group from the first input sample group (S232). The cell searcher may generate the PSS-based sequences and compute the correlation degree between the input samples included in the first input sample group and the PSS-based sequences. The cell searcher may determine input samples having the correlation degree equal to or greater than the first reference value as the first PSS group based on the correlation degree computation result.

The cell searcher may detect the first SSS group corresponding to the first PSS group from one input sample group (S234). The cell searcher may set the SSS configuration by obtaining certain information from the input samples included in the first PSS group, and may generate the SSS reference sequences based on the set SSS configuration. The cell searcher may compute the correlation degree between the input samples included in the first input sample group and the SSS-based sequences. The cell searcher may determine input samples having the correlation degree equal to or greater than the second reference value as the first SSS group based on the correlation degree computation result. In an exemplary embodiment, the first reference value and the second reference value may be identical to or different from each other.

The cell searcher may determine the valid cell by using at least one of the first PSS group and the first SSS group (S236). The cell searcher may generate a comparison value from at least one of a first correlation degree between X (where X is an integer equal to or greater than 1) input samples included in the first PSS group and the corresponding PSS-based sequences, and a second correlation degree between Y (where Y is an integer equal to or greater than 1) input samples included in the first SSS group corresponding to the X input samples and the corresponding SSS-based sequences. The cell searcher may compare the generated comparison value with the third reference value, and may determine whether a cell corresponding to the X input samples and the Y input samples is a valid cell based on the comparison result. For example, the cell searcher may determine that the cell is a valid cell when the generated comparison value is equal to or greater than the third reference value. In an exemplary embodiment, the cell searcher may generate comparison values by applying a first weight to the first correlation degree and a second weight to the second correlation degree, respectively, and adding two generated comparison values. The first weight and the second weight may be values determined by a plurality of simulation results for an accurate valid cell search, and the first weight and the second weight may be set in the cell searcher in advance.

In this manner, the cell searcher may perform the valid cell search operation by using the other input sample groups.

Figure 10A:
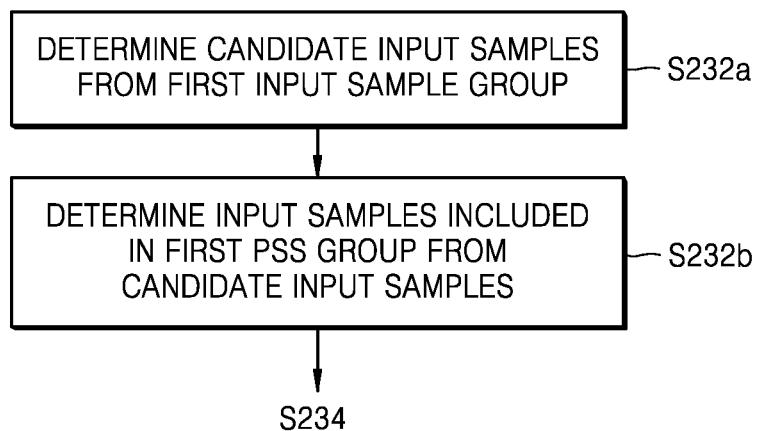
FIGS. 10A and 10B are flowcharts of an operating method of a cell searcher for stably performing a valid cell search operation, according to exemplary embodiments of the inventive concept, respectively.
Figure 10B:
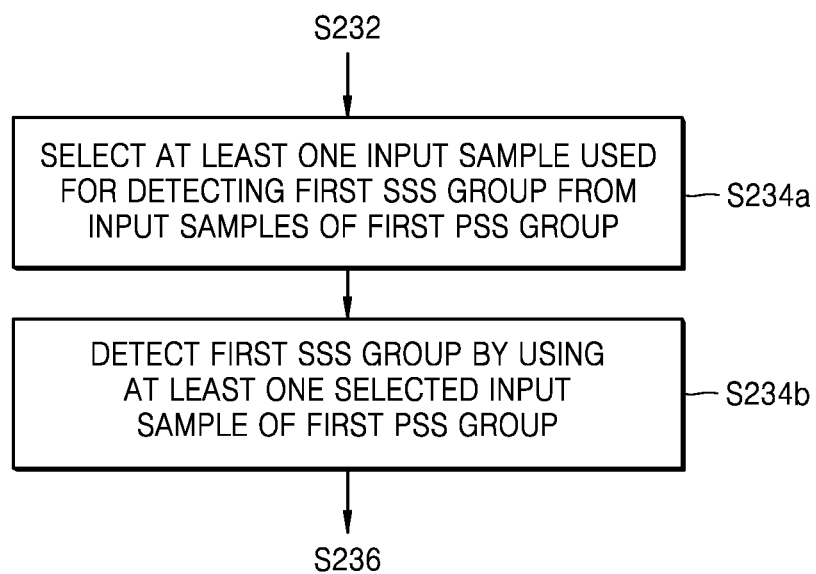

FIGS. 10A and 10B are flowcharts of an operating method of a cell searcher (e.g., the cell searcher 142) for stably performing a valid cell search operation, according to exemplary embodiments of the inventive concept, respectively. As an example, since the first input sample group $1^{st}$ISG is deleted in the third interval $3^{rd}$ITV in FIG. 7, the cell searcher may need to complete the first valid cell search operation using the first input sample group $1^{st}$ISG before the third interval $3^{rd}$ITV starts, that is, within the first search interval VCD_ITV. For example, the cell searcher may apply a method described below such that the valid cell search operation may be completed within the certain search interval before the input sample group utilized for the valid cell search operation is deleted by the multiple buffering.

Referring to FIG. 10A, when the cell searcher performs operation S232 (see FIG. 9), the cell searcher may determine candidate input samples that may be separated from the first input sample group into the first PSS group (S232a). The candidate input samples may have the correlation degrees, between the respective PSS-based sequences, as equal to or greater than the first reference value. The number of input samples included in the first PSS group may be set in advance, or the number of input samples may be set considering at least one of the performance of the terminal, a communication environment of the terminal, and a workload of the terminal. The cell searcher may determine input samples included in the first PSS group from the candidate input samples to match the number of set input samples (S232b). For example, the cell searcher may increase the number of input samples of the first PSS group when it is determined that the first valid cell search operation may be properly performed in the first search interval, and may reduce the number of input samples of the first PSS group when it is determined that the first valid cell search operation may not be properly performed in the first search interval. In addition, in an exemplary embodiment, the cell searcher may, when performing operation S232b, determine the first PSS group from the candidate input samples considering at least one of the magnitude of the correlation degree, frequency intervals between the candidate input samples, etc. Thereafter, the cell searcher may perform operation S234 (see FIG. 9).

Referring to FIG. 10B, when the cell searcher performs operation S234 (see FIG. 9), the cell searcher may select at least one input sample used for detecting the first SSS group from the input samples of the first PSS group (S234a). For example, the cell searcher may select at least one input sample used for first SSS group detection from the input samples of the first PSS group, after considering at least one of the performance of the terminal, the communication environment of the terminal, the workload of the terminal, etc., such that the first valid cell search operation may be completed within the first search interval even when the first PSS group has been determined. In an example, when it is determined that the first valid cell search operation may be performed in the first search interval, the cell searcher may increase the number of input samples of the first PSS group used for the first SSS group detection operation, and when it is determined that the first valid cell search operation may not be performed in the first search interval, the cell searcher may decrease the number of input samples of the first PSS group used for the first SSS group detection operation. The cell searcher may detect the first SSS group by using the selected at least one input sample of the first PSS group (S234b). Thereafter, the cell searcher may perform operation S236 (see FIG. 9).

Figure 11:
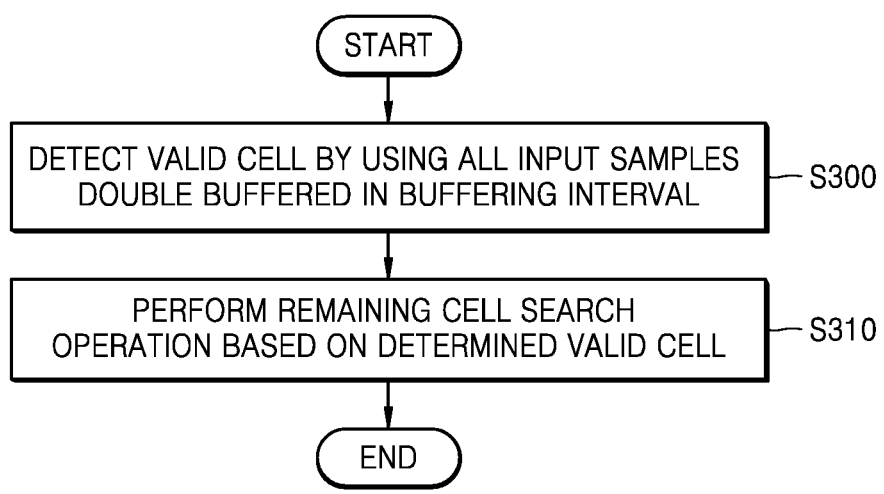
FIGS. 11 and 12 are flowcharts of a method of searching for a cell, performed by a terminal, according to exemplary embodiments of the inventive concept, respectively.
Figure 12:
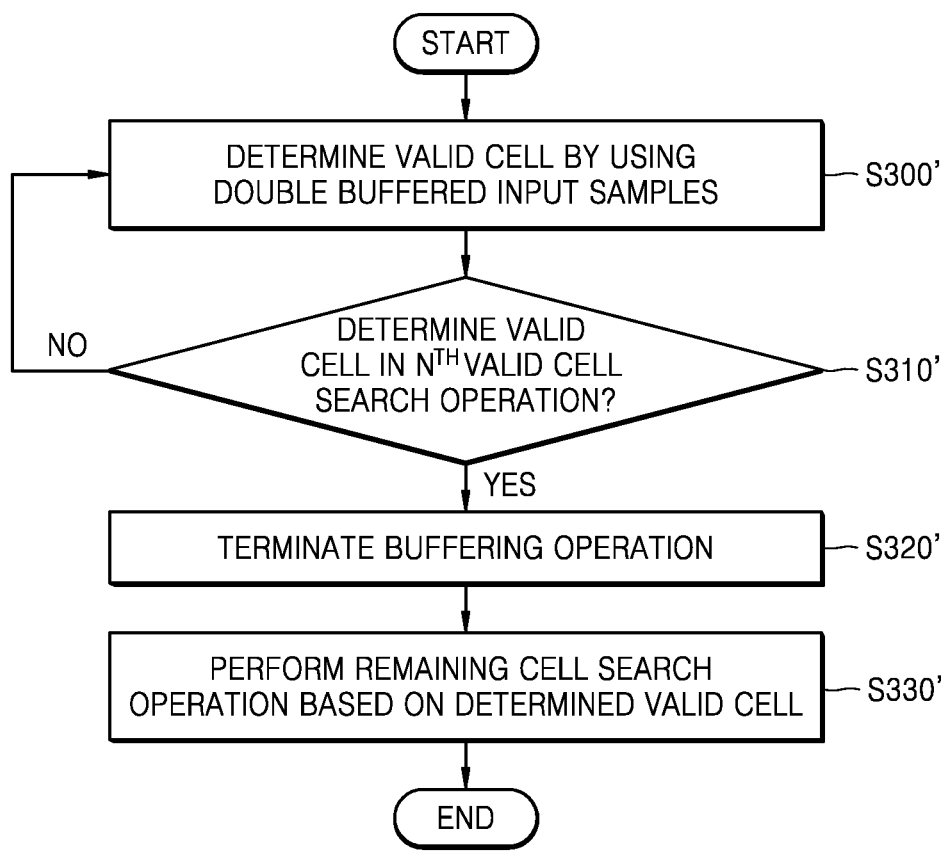

FIGS. 11 and 12 are flowcharts of a method of searching for a cell of a terminal, according to exemplary embodiments of the inventive concept, respectively.

Referring to FIG. 11, the cell searcher may determine the valid cell(s) by using all of the double-buffered input samples in a certain buffering interval (S300). For example, the cell searcher may perform a plurality of valid cell search operations using all of the input sample groups, and may determine the valid cell(s) as a result of performing the plurality of valid cell search operations. The cell searcher may perform remaining cell search operations based on the determined valid cell(s) (S310). For example, the cell searcher may decode the physical broadcast channel PBCH received from the determined valid cell, report the decoding result to the valid cell when the physical broadcast channel PBCH decoding result is successful, and perform wireless communication with the valid cell. However, when the physical broadcast channel PBCH decoding result fails, the cell searcher may decode the physical broadcast channel PBCH received from the other valid cell.

Referring to FIG. 12, the cell searcher may determine the valid cell by performing the valid cell search operation for each input sample group using double-buffered input samples (S300'). The cell searcher may determine whether the valid cell has been determined in L (where L is an integer equal to or greater than 1) effective cell search operations while the valid cell search operation is performed (S310'). The cell searcher may perform operation S300' when operation S310' is 'NO', and may terminate the buffering operation for the input samples that have not yet been buffered when operation S310' is 'YES' (S320'). Alternatively, in FIG. 12, since the buffering operation is terminated when the valid cell is determined, the effective cell search operation for the input sample group, which is not buffered thereafter, may be omitted. Thus, a criterion for determining the valid cell in operation S300' may be stricter than that in operation S300 in FIG. 11 to secure a high likelihood of a cell search success. The cell searcher may perform remaining cell search operations based on the determined valid cell(s) determined in the L valid cell search operations (S330'). For example, the cell searcher may decode the physical broadcast channel PBCH received from the determined valid cell, report the decoding result to the valid cell when the physical broadcast channel PBCH decoding result is successful, and perform wireless communication with the valid cell. However, when the physical broadcast channel PBCH decoding result fails, the cell searcher may newly receive the synchronization signals from the cells and perform the cell search operation again.

Figure 13:
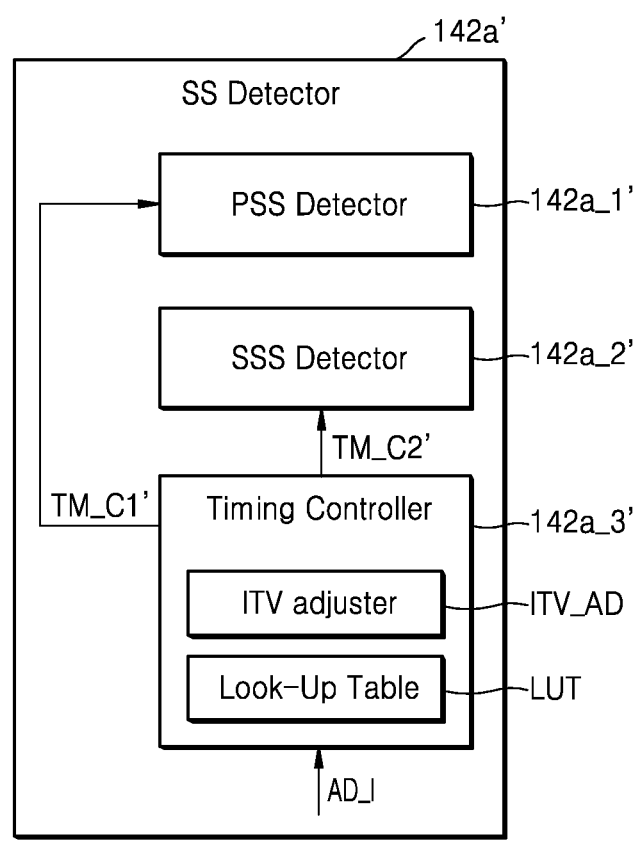
FIG. 13 is a block diagram of a synchronization signal detector according, to an exemplary embodiment of the inventive concept.

FIG. 13 is a block diagram of an SS detector 142a', according to an exemplary embodiment of the inventive concept.

Referring to FIG. 13, the SS detector 142a' may include a PSS detector 142a_1', an SSS detector 142a_2', and a timing controller 142a_3'. Hereinafter, for convenience of explanation, a further description of the configuration, elements, and technical aspects of the SS detector 142a given with reference to FIG. 5 that are the same for the SS detector 142a' of FIG. 13 may be omitted. The timing controller 142a_3' may include an interval adjuster ITV_AD and a look-up table LUT. The interval adjuster ITV_AD according to an exemplary embodiment may adjust the number of input samples included in the input sample group based on adjustment information AD_I, and may adjust the length of the interval in which the input sample group is buffered in a certain memory. The adjustment information AD_I may include information about the communication environment of the terminal, the performance of the terminal, the workload of the terminal, etc. The look-up table LUT may include information about the adjustment information AD_I of various values, the number of input samples included in the input sample group matched to each of the various values, and the length of the interval. The interval adjuster ITV_AD may obtain information about the number of input samples corresponding to the received adjustment information AD_I and the length of the section with reference to the lookup table LUT, and based on the obtained information, may adjust the number of input samples and the length of the section.

However, the timing controller 142a_3' illustrated in FIG. 13 is not limited thereto. For example, in exemplary embodiments, considering various states of the terminal, the number of input samples of the input sample group, the length of the interval where the input sample group is buffered, etc., may be variously adjusted.

FIGS. 14A through 14D are diagrams illustrating lengths of intervals for buffering input sample groups of a cell searcher (e.g., the cell searcher 142), according to exemplary embodiments of the inventive concept, respectively. FIGS. 14A through 14D illustrate exemplary embodiments of intervals included in a buffering interval part $BF\_ITV_{part}$ of the same length.

Figure 14A:
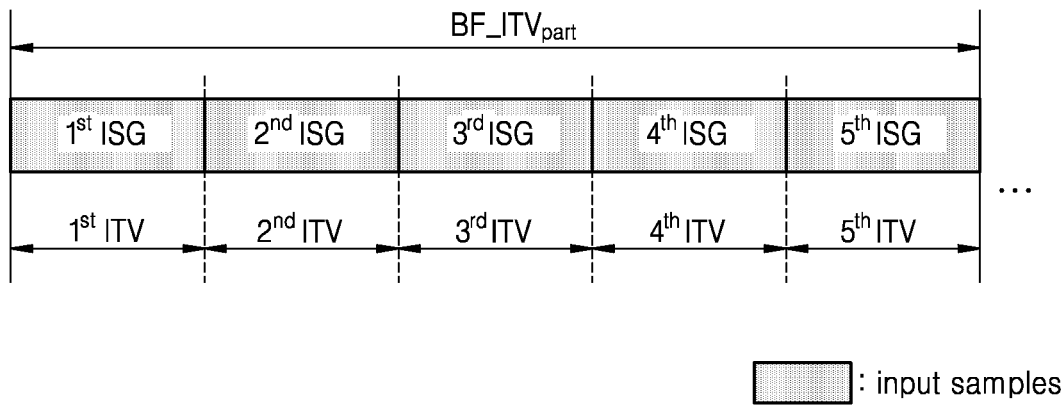
FIGS. 14A through 14D are diagrams illustrating lengths of intervals for buffering input sample groups of a cell searcher, according to exemplary embodiments of the inventive concept, respectively.

Referring to FIG. 14A, the buffering interval part $BF\_ITV_{part}$ may include the first through fifth intervals $1^{st}ITV$ through $5^{th}ITV$. The first through fifth intervals $1^{st}ITV$ through $5^{th}ITV$ may have the same length, and accordingly, the number of input samples included in each of the first through fifth input sample groups $1^{st}ISG$ through $5^{th}ISG$ may be the same.

Figure 14B:
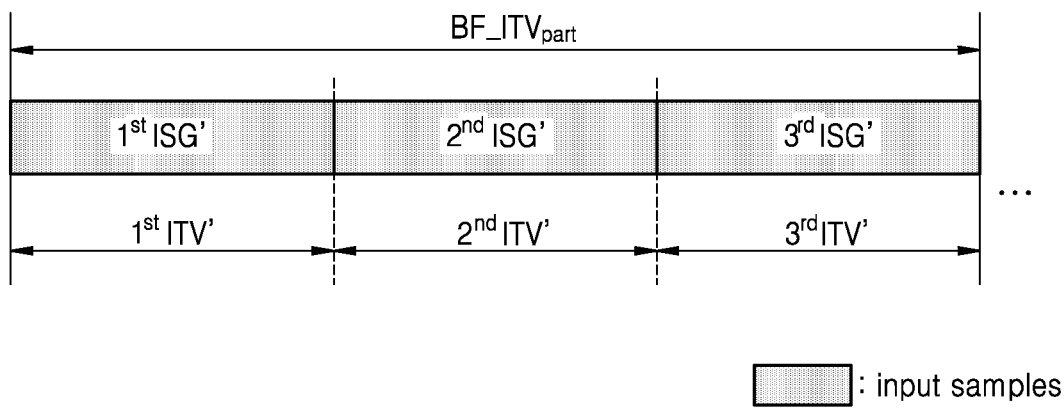

Referring to FIG. 14B, the buffering interval part $BF\_ITV_{part}$ may include first through third intervals $1^{st}ITV'$ through $3^{rd}ITV'$. The first through third intervals $1^{st}ITV'$ through $3^{rd}ITV'$ may have the same length, and the length thereof may be greater than that of the first through fifth intervals $1^{st}ITV$ through $5^{th}ITV$ in FIG. 14A. However, the number of input samples included in each of the first to third input sample groups $1^{st}ISG'$ through $3^{rd}ISG'$ may be the same, and the number thereof may be greater than that of the input samples included in each of the first to fifth input sample groups $1^{st}ISG$ through $5^{th}ISG$ in FIG. 14A.

Figure 14C:
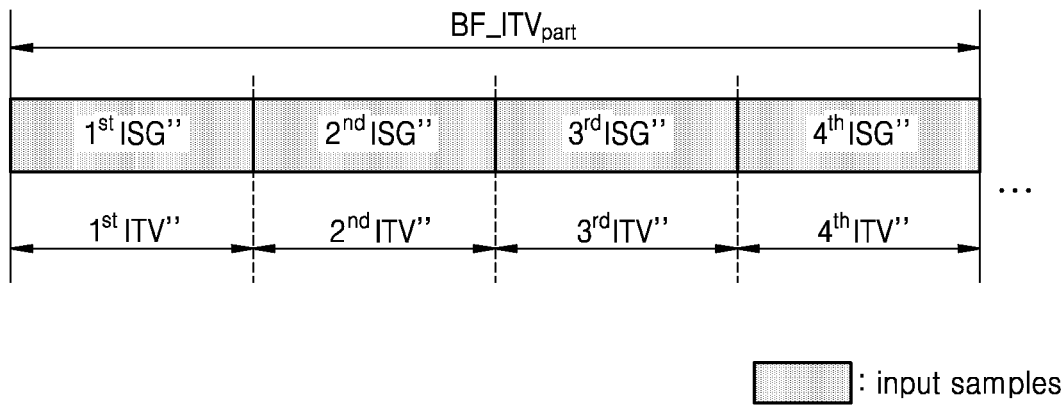

Referring to FIG. 14C, the buffering interval part $BF\_ITV_{part}$ may include first through fourth intervals $1^{st}ITV''$ through $4^{th}ITV''$. The first and third intervals $1^{st}ITV''$ and $3^{rd}ITV''$ may have the same length, and accordingly, the number of input samples included in each of first and third intervals $1^{st}ISG''$ and $3^{rd}ISG''$ may be the same. In addition, the second and fourth intervals $2^{nd}ITV''$ and $4^{th}ITV''$ may have the same length, and accordingly, the number of input samples included in each of the second and fourth intervals $2^{nd}ITV''$ and $4^{th}ITV''$ may be the same. Alternatively, the length of the first and third intervals $1^{st}ITV''$ and $3^{rd}ITV''$ may be different from that of the second and fourth intervals $2^{nd}ITV''$ and $4^{th}ITV''$. Accordingly, the number of input samples of the first and third input sample groups $1^{st}ISG''$ and $3^{rd}ISG''$ may be different from the number of input samples of the second and fourth input sample groups $2^{nd}ISG''$ and $4^{th}ISG''$. The length of the first and third intervals $1^{st}ITV''$ and $3^{rd}ITV''$ may be less than the length of the second and fourth intervals $2^{nd}ITV''$ and $4^{th}ITV''$, and the number of input samples of the third input sample group $1^{st}ISG''$ and $3^{rd}ISG''$ may be less than the number of input samples of the second and fourth input sample groups $2^{nd}ISG''$ and $4^{th}ISG''$.

Figure 14D:
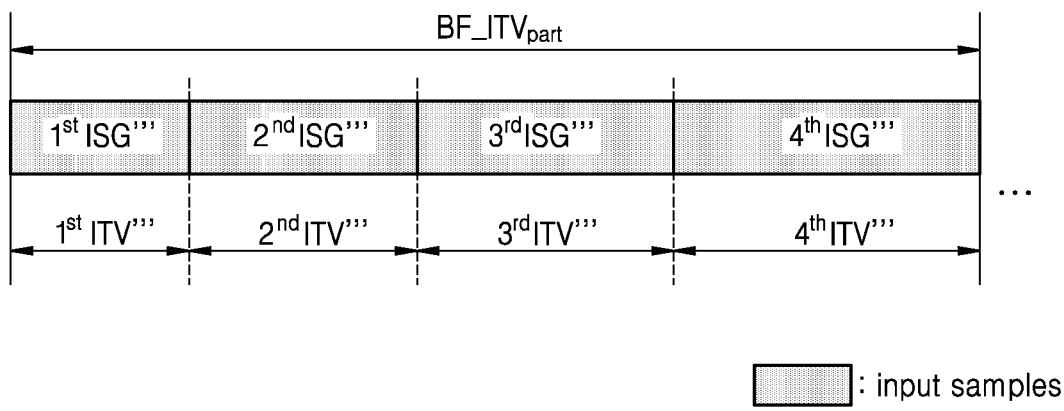

Referring to FIG. 14D, the buffering interval part $BF\_ITV_{part}$ may include first through fourth intervals $1^{st}ITV'''$ through $4^{th}ITV'''$. The lengths of the first through fourth intervals $1^{st}ITV'''$ through $4^{th}ITV'''$ may be different from each other, and accordingly, the numbers of input samples included in each of first through fourth input sample groups $1^{st}ISG'''$ through $4^{th}ISG'''$ may be different from each other.

As illustrated in FIGS. 14A through 14D, lengths of intervals for buffering an input sample group may be variously implemented, and the capacities of memories for multiple buffering may be variously implemented according to the lengths of the intervals. In addition, as described above with reference to FIG. 13, the timing controller 142a_3' may dynamically adjust the lengths of the intervals as illustrated in FIGS. 14A through 14D in consideration of the communication environment of the terminal, the performance of the terminal, the workload of the terminal, etc. In this case, the capacity of the buffer memories may be implemented in consideration of the maximum length of the interval (or the maximum number of input samples of the input sample group).

Figure 15:
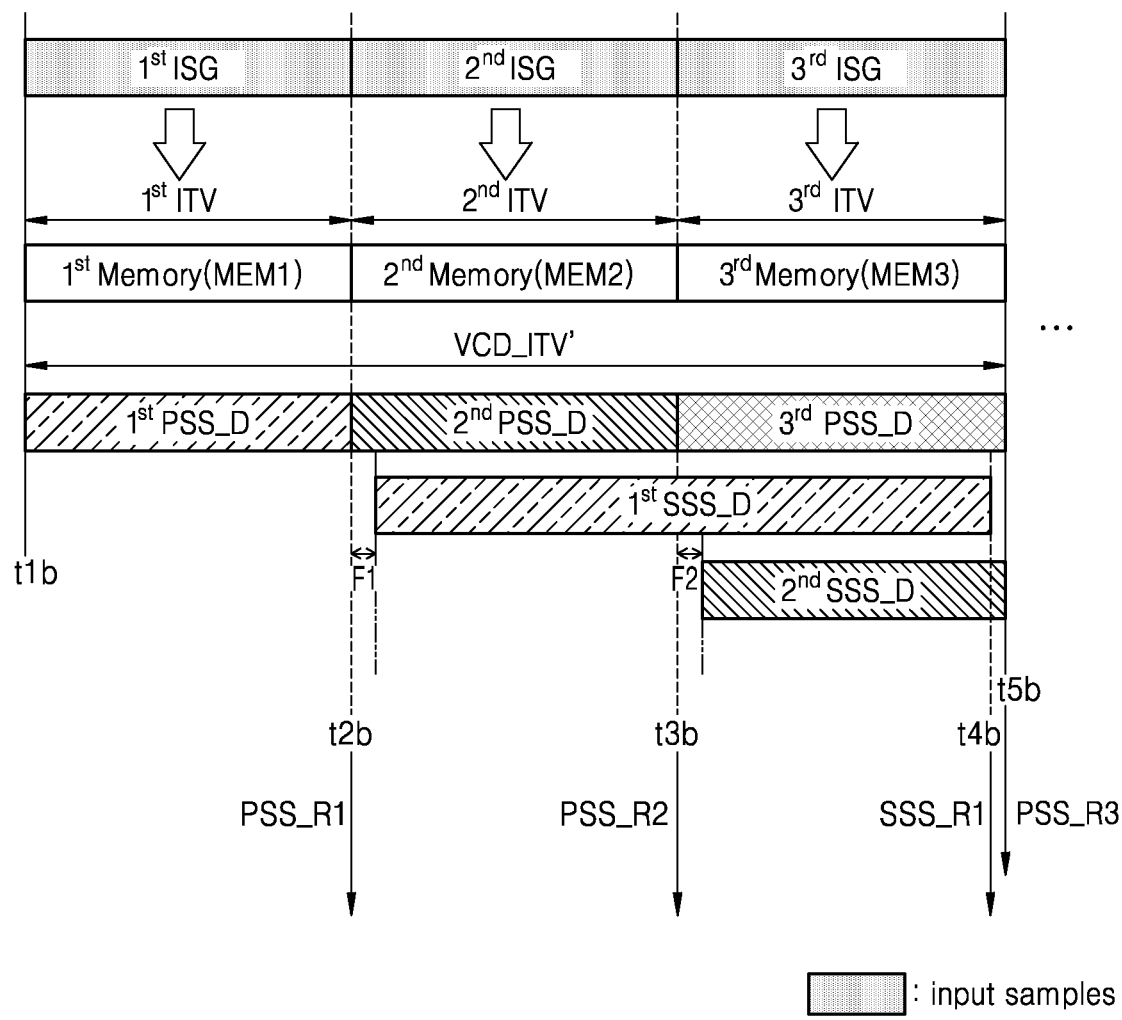
FIG. 15 is a diagram for explaining a detailed operating method of a cell searcher, according to an exemplary embodiment of the inventive concept.

FIG. 15 is a diagram illustrating a detailed operating method of a cell searcher (e.g., the cell searcher 142), according to an exemplary embodiment of the inventive concept. In FIG. 15, it is assumed that the valid cell search operation is performed based on a triple buffering operation using first through third memories MEM1 through MEM3.

Referring to FIG. 15, the cell searcher may generate the first PSS group detection result PSS_R1 by performing the first PSS group detection operation $1^{st}PSS\_D$ from the first input sample group $1^{st}ISG$, while buffering the first input sample group $1^{st}ISG$ in a first memory MEM1 in the first interval $1^{st}ITV$ corresponding to a time between a time point 't1b' and a time point 't2b'.

The cell searcher buffers the second input sample group $2^{nd}ISG$ in the second memory MEM2 in the second interval $2^{nd}ITV$ corresponding to the time 't2b' time to a 't3b' time. The second PSS group detection result PSS_R2 may be generated by performing a second PSS group detection operation $2^{nd}PSS\_D$ from the input sample group $2^{nd}ISG$. The cell searcher may generate the third PSS group detection result PSS_R3 by performing the third PSS group detection operation $3^{rd}PSS\_D$ from the third input sample group $3^{rd}ISG$, while buffering the third input sample group $3^{rd}ISG$ in the third memory MEM3 in the third interval $3^{rd}ITV$ corresponding to a time between the time point 't3b' and a time point 't5b'.

The cell searcher may set the SSS configuration for performing the first SSS group detection operation $1^{st}SSS\_D$ based on the first PSS group detection result PSS_R1 in a certain interval F1 from a time point identical or similar to the time point 't2b'. The cell searcher may perform the first SSS group detection operation $1^{st}SSS\_D$ within the second interval $2^{nd}ITV$ and the third interval $3^{rd}ITV$ based on the set SSS configuration, and generate the first SSS group detection result SSS_R1 until a time point 't4b'. Thereafter, the cell searcher may determine a valid cell by using at least one of the first PSS group detection result PSS_R1 and the first SSS group detection result SSS_R1 during a time interval between the time point 't4b' and the time point 't5b'.

Thereafter, as a fourth input sample group is buffered in the first memory MEM1 in a fourth interval, the first input sample group $1^{st}ISG$ may be deleted from the first memory MEM1. In this manner, the cell searcher may secure the time for storing the first input sample group $1^{st}ISG$ in the first memory MEM1 through triple buffering instead of through double buffering, and accordingly, a first search interval VCD_ITV' in which the first valid cell search operation (that is, the first PSS group detection operation $1^{st}PSS\_D$ and the first SSS group detection operation $1^{st}SSS\_D$) is performed may be lengthened. The result thereof may be applied to search intervals for other valid cell search operations, and thus, the cell searcher may stably perform the valid cell search operation in lengthened search intervals. However, it is to be understood that FIG. 15 illustrates an exemplary embodiment, and multiple buffering for the input samples by using more memories may be performed according to exemplary embodiments.

Figure 16:
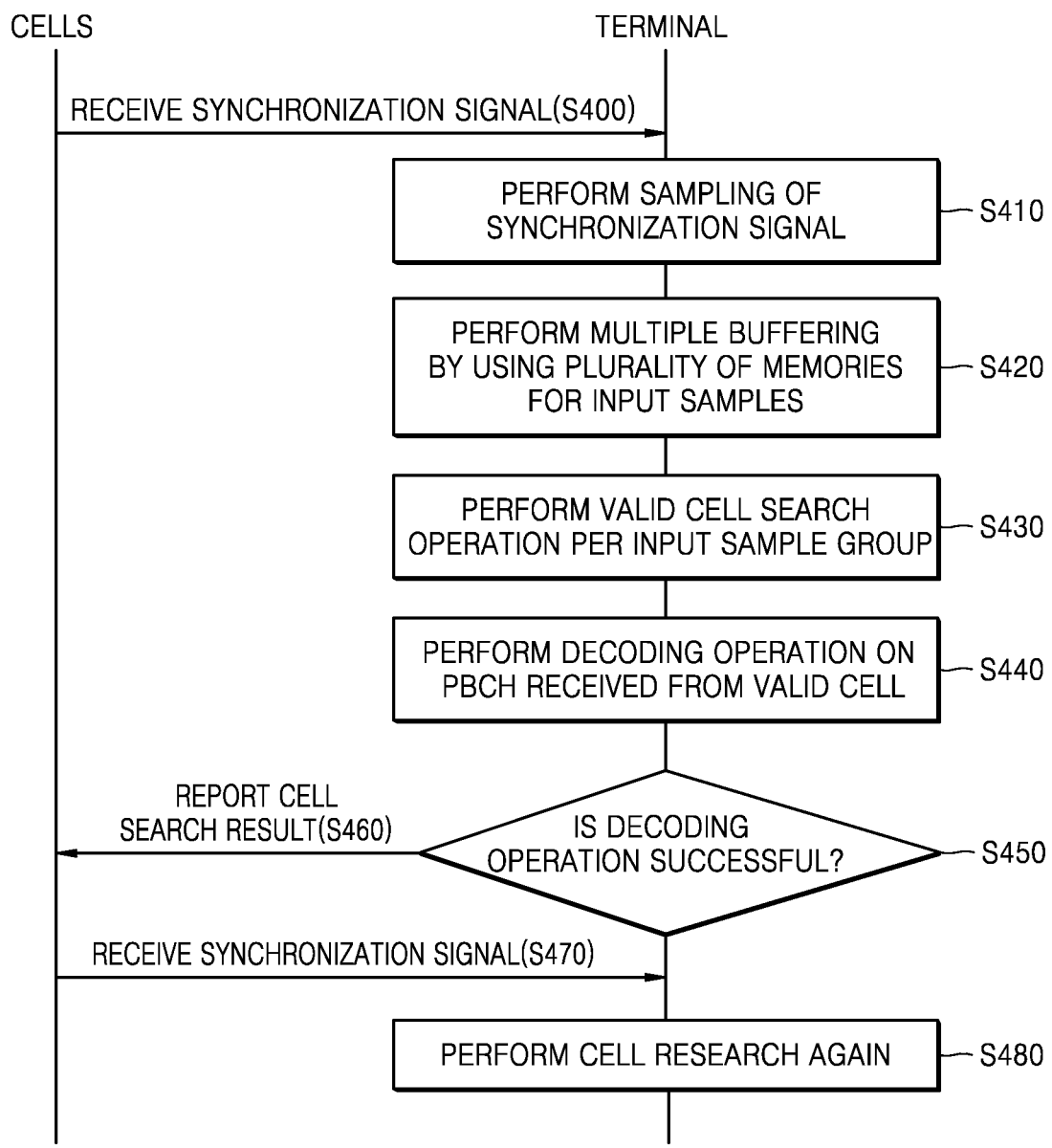
FIG. 16 is a flowchart illustrating a method of searching for a cell of a terminal, according to an exemplary embodiment of the inventive concept.

FIG. 16 is a flowchart illustrating a method of searching for a cell of a terminal, according to an exemplary embodiment of the inventive concept.

Referring to FIG. 16, the terminal may receive a plurality of synchronization signals (SS) from cells (S400). The terminal may generate input samples by performing a sampling operation on the received plurality of SS based on a certain sampling frequency (S410). The terminal may perform a multiple buffering operation on the input samples by using the plurality of memories (S420). For example, the plurality of memories may alternately perform the buffering operation on each of assigned input sample groups. The terminal may perform the valid cell search operation for each input sample group (S430). The terminal may determine the valid cell as a result of performing the valid cell search operation for at least one time, and may decode the physical broadcast channel PBCH received from the determined valid cell (S440). The terminal may determine whether decoding of the physical broadcast channel PBCH has succeeded (S450). When a result of operation S450 is 'YES', the terminal may report the cell search result to the valid cell (460). When the result of operation S450 is 'NO', the terminal may receive a new SS (S470). The terminal may again perform the cell search including the valid cell search operation for each input sample group based on the multiple buffering (S480).

Figure 17:
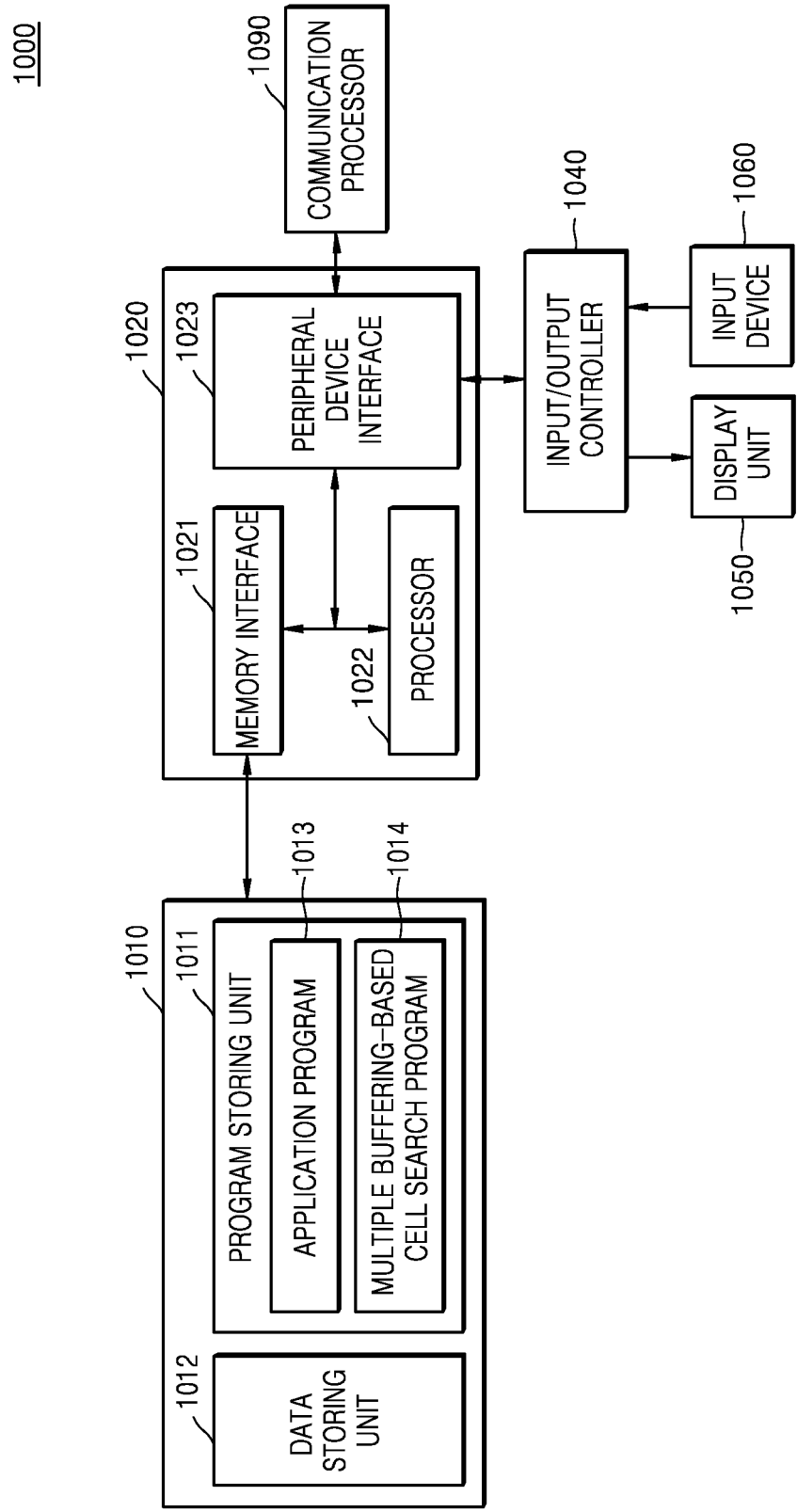
FIG. 17 is a block diagram of an electronic device, according to an exemplary embodiment of the inventive concept.

FIG. 17 is a block diagram of an electronic device 1000, according to an exemplary embodiment of the inventive concept.

Referring to FIG. 17, the electronic device 1000 may include a memory 1010, a processor unit 1020, an input/output controller 1040, a display unit 1050, an input device 1060, and a communication processing unit 1090. Here, a plurality of memories 1010 may exist.

The memory 1010 may include a program storage unit 1011 for storing programs for controlling an operation of the electronic device 1000, and a data storage unit 1012 for storing data generated during program execution. The data storage unit 1012 may store data utilized for operations of an application program 1013 and a multiple buffering-based cell search program 1014. The program storage unit 1011 may include an application program 1013 and a multiple buffering-based cell search program 1014. Here, programs included in the program storage unit 1011 may be sets of instructions and may be expressed as instruction sets.

The application program 1013 may include application programs operable in the electronic device 1000. For example, the application program 1013 may include application instructions executed by a processor 1022. The multiple buffering-based cell search program 1014 may divide input samples into input sample groups, alternately buffer the plurality of memories, and perform the valid cell search operation per input sample group, according to exemplary embodiments of the inventive concept.

A peripheral device interface 1023 may control a connection of an input/output peripheral device of a base station to the processor 1022 and a memory interface 1021. The processor 1022 may control the base station to provide an applicable service by using at least one software program. At this time, the processor 1022 may execute at least one program stored in the memory 1010 to provide a service corresponding to an applicable program.

The input/output controller 1040 may provide an interface between an input/output device such as the display unit 1050 and the input device 1060 and the peripheral device interface 1023. The display unit 1050 may display, for example, status information, input characters, moving pictures, still pictures, etc. For example, the display unit 1050 may display information about an application program executed by the processor 1022.

The input device 1060 may provide input data generated by a selection of the electronic device 1000 to the processor unit 1020 via the input/output controller 1040. In this case, the input device 1060 may include a keypad including at least one hardware button and a touchpad for sensing touch information. For example, the input device 1060 may provide, via the input/output controller 1040, the touch information such as a touch, a touch movement, and a touch release that have been sensed by the touch pad, to the processor 1022. The electronic device 1000 may include the communication processing unit 1090 that performs communication functions for voice communication and data communication.

As is traditional in the field of the present inventive concept, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the inventive concept has been particularly shown and described with reference to the exemplary embodiments thereof, it will be understood that various changes in form and detail may be made therein without departing from the spirit and scope of the inventive concept as defined by the following claims.

What is claimed is:

1. An operating method of a terminal configured to perform a cell search by using a first memory and a. second memory for buffering input samples, the method comprising:
    detecting a first primary synchronization signal (PSS) group from a first input sample group while buffering the first input sample group in the first memory in a first interval;
    while buffering a second input sample group in the second memory in a second interval following the first interval, detecting a second PSS group from the second input sample group, and a first secondary synchronization signal (SSS) group corresponding to the first PSS group from the first input sample group; and
    while buffering a third input sample group in the first memory in a third interval following the second interval, detecting a third PSS group from the third input sample group, and a second SSS group corresponding to the second PSS group from the second input sample group.

2. The method of claim 1, wherein
a number of input samples of the first PSS group is set in advance to complete detection of the first SSS group in the second interval, or a number of input samples of the first PSS group used for detecting the first SSS group is limited.

3. The method of claim 1, wherein detecting the first PSS group further comprises:
computing a correlation degree between input samples of the first input sample group and PSS-based sequences; and
determining the first PSS group from the first input sample group based on the correlation degree.

4. The method of claim 1, wherein detecting the first SSS group further comprises:
selecting any one of input samples included in the first PSS group;
setting an SSS configuration based on information obtained from the selected input sample; and.
detecting an SSS corresponding to the selected input sample based on the set SSS configuration.

5. The method of claim 4, wherein detecting the SSS further comprises:
generating an SSS-based sequence based on the set SSS configuration;
computing a correlation. degree between the SSS-based sequence and input samples of the first input sample group; and
detecting the SSS based on the correlation degree.

6. The method of claim 1, wherein
the first SSS group is detected from the first input sample group stored in the first memory.

7. The method of claim 1, further comprising:
determining a valid cell among a plurality of cells corresponding to the first PSS group and the first SSS group in a buffering interval of the terminal including the first interval through the third interval.

8. The method of claim 7, wherein determining the valid cell comprises:
generating a comparison value from at least one of a first correlation degree between X input samples included in the first PSS group and a corresponding PSS-based sequence, and a second correlation degree between Y input samples, which are included in the first SSS group and corresponding to the X input samples, and corresponding SSS-based sequences,
wherein X is an integer equal to or greater than 1, and Y is an integer equal to or greater than 1;
comparing the comparison value to a reference value; and
determining whether a cell corresponding to the X input samples and the Y input samples based on the comparison result is the valid cell.

9. The method of claim 8, wherein generating the comparison value comprises:
generating the comparison value by adding the first correlation degree having a first weight applied thereto to the second correlation degree having a second weight applied thereto.

10. The method of claim 7, further comprising:
when at least one of the plurality of cells is determined as the valid cell, terminating a buffering operation for the input samples; and
performing a decoding operation for a physical broadcast channel (PBCH) received from the valid cell.

11. The method of claim 10, further comprising:
when decoding operation for the PBCH is successful, reporting a cell search result to the valid cell and terminating the cell search.

12. An operating method of a cell terminal equipped with a plurality of memories for alternately buffering input samples generated for a cell search operation in a certain buffering interval, the method comprising:
buffering a first input sample group utilized for a first valid cell search operation in a first interval in a first memory; and
buffering a second input sample group utilized for a second valid cell search operation in a second interval following the first interval in a second memory,
wherein the first valid cell search operation is performed by using the first input sample group in a first search interval including the first interval and the second interval.

13. The method of claim 12, wherein the first valid cell search operation comprises:
detecting a first primary synchronization signal (PSS) group from the first input sample group;
detecting a first secondary synchronization signal (SSS) group corresponding to the first PSS group from the first input sample group; and
determining a valid cell by using the first PSS group and the first SSS group.

14. The method of claim 13, wherein determining the valid cell further comprises;
determining whether a cell corresponding to X input samples and Y input samples is a valid cell, based on a first correlation degree between the X input samples included in the first PSS group and a corresponding PSS-based sequence, and a second correlation degree between Y input samples, which are included in the first SSS group and corresponding to the X input samples, and a corresponding SSS-based sequence,
wherein X is an integer equal to or greater than 1, and Y is an integer equal to or greater than 1.

15. The method of claim 12, further comprising:
buffering a third input sample group utilized for a third valid cell search operation in a third interval following the second interval in the first memory,
wherein the first input sample group is deleted. in the third interval.

16. The method of claim 12, further comprising:
buffering a third input sample group utilized for a third valid cell search operation in a third interval following the second interval in a third memory,
wherein the first search interval further comprises the third interval.

17. The method of claim 16, further comprising:
buffering a fourth input sample group utilized for a fourth valid cell search operation in a fourth interval following the third interval in the first memory,
wherein the first input sample group is deleted in the fourth interval.

18. The method of claim 12, wherein
lengths of the first interval and the second interval vary according to at least one of a communication environment of the terminal, a performance of the terminal, and a workload of the terminal.

19. A terminal, comprising:
a buffer divided into a first memory and a second memory for alternately buffering input samples generated for a cell search operation in a certain buffering interval; and
a baseband processor configured to control a first valid cell search operation from a first input sample group to be buffered in the first memory in a first interval during a first search interval comprising the first interval and a second interval following the first interval, wherein a second input sample group utilized for a second valid cell search operation in the second interval is buffered in the second memory.

20. The terminal of claim 19, wherein the first memory and the second memory of the buffer are physically or virtually divided.

* * * * *